United States Patent
Yang et al.

(10) Patent No.: US 10,487,176 B2
(45) Date of Patent: Nov. 26, 2019

(54) NYLON SALT AND PREPARATION METHOD THEREFOR

(71) Applicants: Cathay Biotech Inc., Shanghai (CN); CIBT America Inc., Newark, DE (US)

(72) Inventors: Chen Yang, Shanghai (CN); Bingbing Qin, Shanghai (CN); Yi Zheng, Shanghai (CN); Charlie Liu, Shanghai (CN); Naiqiang Li, Shanghai (CN); Xiucai Liu, Shanghai (CN)

(73) Assignees: Cathay Biotech Inc., Shanghai (CN); CIBT America Inc., Newark, DE (US)

( * ) Notice: Subject to any disclaimer, the term of this patent is extended or adjusted under 35 U.S.C. 154(b) by 0 days.

(21) Appl. No.: 15/536,906

(22) PCT Filed: Dec. 17, 2014

(86) PCT No.: PCT/CN2014/094126
§ 371 (c)(1),
(2) Date: Jun. 16, 2017

(87) PCT Pub. No.: WO2016/095137
PCT Pub. Date: Jun. 23, 2016

(65) Prior Publication Data
US 2017/0349705 A1 Dec. 7, 2017

(51) Int. Cl.
*C08G 69/28* (2006.01)
*C08G 69/26* (2006.01)

(52) U.S. Cl.
CPC ............. *C08G 69/28* (2013.01); *C08G 69/26* (2013.01)

(58) Field of Classification Search
CPC .................................. C08G 69/26; C08G 69/28
See application file for complete search history.

(56) References Cited

U.S. PATENT DOCUMENTS

| | | | |
|---|---|---|---|
| 5,801,278 A * | 9/1998 | Bletsos | C07C 51/412 562/590 |
| 2011/0020628 A1 | 1/2011 | Fukudome et al. | |
| 2012/0016077 A1 * | 1/2012 | Kato | C08G 69/26 524/606 |
| 2013/0018166 A1 * | 1/2013 | Nakai | C08G 69/26 528/347 |
| 2013/0172521 A1 * | 7/2013 | Nakai | C08G 69/26 528/347 |
| 2015/0361216 A1 * | 12/2015 | Grolman | C08G 69/32 528/347 |

FOREIGN PATENT DOCUMENTS

| | | | |
|---|---|---|---|
| CN | 101768266 | * | 7/2010 |
| CN | 103201314 | A | 7/2013 |
| CN | 103724209 | A | 4/2014 |
| CN | 103980486 | A | 8/2014 |
| JP | 2011513820 | A | 4/2011 |
| JP | 2014524928 | A | 9/2014 |
| WO | 2012070457 | A1 | 5/2012 |

OTHER PUBLICATIONS

European Search Report for EP1498172.1 dated Jul. 25, 2018.

* cited by examiner

*Primary Examiner* — Gregory Listvoyb
(74) *Attorney, Agent, or Firm* — Fox Rothschild LLP

(57) ABSTRACT

The present invention provides a method for preparing nylon salt, which comprises mixing 1,5-pentanediamine, water and dicarboxylic acid at a temperature of 65 to 120° C. to obtain a nylon salt, wherein the amount of the water is 2% to 12% by weight based on the total weight of the 1,5-pentanediamine and the dicarboxylic acid. The present invention also provides a nylon salt. According to the present method for preparing nylon salt, the incomplete reaction between the 1,5-pentanediamine and the dicarboxylic acid, which is caused by the nylon salt present during the preparation in a solid state, can be avoided; the reaction between the 1,5-pentanediamine and the dicarboxylic acid can be significantly speeded up, and the reaction time is accordingly shorten. Consequently, the content of diamine and dicarboxylic acid remained in the resulting nylon salt is very low. In addition, the final nylon salt product, which present in a solid state, makes it easier to be stored and transported.

8 Claims, No Drawings

NYLON SALT AND PREPARATION METHOD THEREFOR

TECHNICAL FIELD

The present invention relates to a nylon salt and the method for preparing the same, in particular, to the nylon salt with low content of diamine and dicarboxylic acid remained therein and the method for preparing the same.

BACKGROUND

In the prior art, nylons are typically prepared by polycondensation of diamine with dicarboxylic acid. Generally, in order to keep the molar amount of diamine as equal to that of dicarboxylic acid as possible, a nylon salt is first prepared from diamine and dicarboxylic acid, which is then subjected to a polycondensation process. Therefore, as precursor of nylon polymer, the nylon salt has a great effect on the polymer in quality. Qualified nylon salt is a base for producing a nylon polymer of high quality.

In the present market, nylon salt comprises aqueous solution of nylon salt and nylon salt in solid state. The aqueous solution of nylon salt is being gradually replaced by the solid nylon salt since the former has high water content, which leads a high cost for long distance transportation, and has low stability as well. In contrast, the solid nylon salt has high stability and low transport cost, and is therefore the main product in domestic and abroad markets.

Solution process is usually used in the known preparation of nylon salt, comprising dissolving or dispersing diamine and dicarboxylic acid in water separately, and mixing both of them for a neutralization reaction. The end-point of the reaction is determined by the pH of the mixture solution. After completion of the reaction, nylon salt is obtained by the steps of separation, purification and drying in sequence.

In the formation of a nylon salt, diamine and dicarboxylic acid are in equimolar amount mixed and reacted to form the nylon salt. With the reaction processing, the amount of diamine in a free state reduced gradually until the completion of the reaction. If the diamine and the dicarboxylic acid were not mixed evenly in the reaction process, the content of the unreacted diamine in nylon salt product will be high, which will bring about an important influence on the quality of the nylon salt. In addition, when exposed to the air, the amine is not chemically stable and is subjected to some side reactions under heat treatment or contacting with oxygen, which may cause the quality of nylon salt to be deteriorated and to become yellow in color. Furthermore, the changes described above will significantly bring about a negative influence on the production of nylon. In order to obtain a nylon salt with high quality, therefore, the content of free diamine remained in the nylon salt should be extremely low or nonexistent.

The Chinese patent application publication CN1887841A disclosed a solution process for preparing nylon salt, in which water is used as solvent. In addition to water, such organic solvents as alcohol or N,N-dimethylformamide (DMF) can also be used as solvent in the solution process for preparing nylon salt. The Chinese patent application publication CN101456804A disclosed use of N-methyl pyrrolidone or DMF as solvent in the solution process for preparing nylon salt. And dimethyl sulfoxide (DMSO) can be used as solvent in the solution process for preparing nylon salt, as disclosed in the Chinese patent application publication CN101880235A.

However, in these existing solution processes for preparing nylon salt, there exist the following defects. In case of using water as solvent to prepare nylon salt, it is difficult to obtain solid nylon salt by cooling-crystallization efficiently, because nylon salt has high solubility in water. Although concentrating-crystallization is alternative, it may cause the quality of nylon salt to become worse by reason of high temperature. Therefore, the preparation of nylon salt from its aqueous solution will give a high cost, and the product as obtained is not stable in quality. Further, in case of using organic solvent to prepare solid nylon salt, it is readily to cause the organic solvent to be remained in nylon salt, and the recovery of the organic solvent will bring about a high energy consumption, heavy pollution and high cost. Thus, the process for preparing nylon salt by way of organic solvent is also undesirable.

The Chinese patent application publication CN103201314A disclosed a method for preparing nylon salt under low water content, in which a diamine in liquid is reacted with a dicarboxylic acid powder. However, this reaction should be carried out at a temperature of 100 to 210° C. which is higher than the melting point of pentanediamine, and is not a mild reaction. And the nylon salt obtained by this high temperature reaction will render the nylon product produced in the subsequent polymerization yellowing, which would bring an adverse effect on the color of the nylon product. Besides, there are very strict limitations to the reactive system, the manner of stirring, the reaction temperature, the mode for adding dicarboxylic acid and so on, and the method is accordingly a complicated process. As such reaction is carried out between a liquid reactant and a solid reactant, some free dicarboxylic acid is inevitably remained in the final product.

In a word, it is difficult for the conventional preparation to directly obtain a nylon salt with low residual diamine and dicarboxylic acid content and without adverse effect on the subsequent polymerization producing nylon.

DISCLOSURE OF THE INVENTION

To solve the above-mentioned technical problems, the present invention provides a method for preparing nylon salt, which comprises mixing 1,5-pentanediamine, water and dicarboxylic acid at a temperature of 65 to 120° C. to obtain a nylon salt, wherein the amount of the water is 2% to 12% by weight based on the total weight of the 1,5-pentanediamine and the dicarboxylic acid.

According to one embodiment of the present invention, wherein said method comprises: a) mixing 1,5-pentanediamine and water to obtain a mixture; b) heating the mixture to the temperature of 65 to 120° C.; and c) adding the dicarboxylic acid to the heated mixture to obtain the nylon salt; wherein the amount of the water is 2% to 12% by weight based on the total weight of the 1,5-pentanediamine and the dicarboxylic acid.

According to another embodiment of the present invention, wherein the amount of the water is 3% to 8% by weight based on the total weight of the 1,5-pentanediamine and the dicarboxylic acid.

According to another embodiment of the present invention, wherein the amount of the water is 4% to 5% by weight based on the total weight of the 1,5-pentanediamine and the dicarboxylic acid.

According to another embodiment of the present invention, wherein said step b) comprises: heating the mixture to a temperature of 70 to 100° C.

According to another embodiment of the present invention, wherein said step b) comprises: heating the mixture to a temperature of 80 to 90° C.

According to another embodiment of the present invention, wherein said step c) comprises: adding the dicarboxylic acid to the heated mixture to react with the 1,5-pentanediamine; cooling the resulting product to a temperature of 20 to 40° C. to obtain the nylon salt.

According to another embodiment of the present invention, wherein the method is carried out under the protection of inert gas, which is one or more selected from the group consisting of nitrogen, helium, neon, and argon.

According to another embodiment of the present invention, wherein the molar ratio of the 1,5-pentanediamine and the dicarboxylic acid is 1/0.9 to 1/1.2.

According to another embodiment of the present invention, wherein the dicarboxylic acid is one or more selected from the group consisting of aliphatic dicarboxylic acid, aromatic dicarboxylic acid, and heterocyclic dicarboxylic acid.

According to another embodiment of the present invention, wherein the dicarboxylic acid is one or more selected from the group consisting of succinic acid, adipic acid, decanedioic acid, dodecanedioic acid, p-phthalic acid, and furan dicarboxylic acid.

The present invention also provides a nylon salt prepared according to any one of the embodiments mentioned above.

According to the present method for preparing nylon salt, the incomplete reaction between the 1,5-pentanediamine and the dicarboxylic acid, which is caused by the nylon salt present during the preparation in a solid state, can be avoided; the neutralization reaction between the 1,5-pentanediamine and the dicarboxylic acid can be significantly speeded up, and the reaction time is accordingly shorten; and the reaction extent may come up to nearly 100%. Consequently, the content of diamine and dicarboxylic acid remained in the resulting nylon salt is very low. In addition, the final nylon salt product, which present in a solid state, makes it easier to be stored and transported.

DETAILED DESCRIPTION OF THE EMBODIMENTS

Typical examples illustrating the features and advantages of the present invention will be described in detail in the following description. It should be understood that the invention can have various changes in various embodiments without departing from the scope of the invention and the description herein is by way of illustration only and is not intended to limit the invention.

To achieve the aim mentioned above, provided herein is a method for preparing nylon salt, which comprises steps of mixing 1,5-pentanediamine, water and dicarboxylic acid at a temperature of 65 to 120° C. to produce the nylon salt, wherein the amount of the water is 2% to 12% by weight based on the total weight of 1,5-pentanediamine and dicarboxylic acid.

In the present invention, a nylon salt with low content of free diamine is produced by adding a specified amount of water in the preparation. If the addition of water is too low, the nylon salt may not be completely mixed and reacted, and too much free diamine will be remained, which will affect the quality of the resulting nylon salt. If the addition of water is too high, it is unable to directly obtain nylon salt solid just by cooling after the formation of salt, or otherwise the solid nylon salt obtained is prone to harden, which makes it difficult to be transported.

Of these, the quantity of the water makes the nylon salt present in a molten state at the temperature of 65 to 120° C. There are no limitations to the order or mode for adding water, dicarboxylic acid and 1,5-pentanediamine in the present method. It is feasible to add specified amount of water to the 1,5-pentanediamine before the addition of dicarboxylic acid. It is allowable to add the specified amount of water to dicarboxylic acid to get a mixture, then add the mixture to 1,5-pentanediamine. It is also allowable to mix 1,5-pentanediamine with dicarboxylic acid, then add specified amount of water thereto. In addition, it is also possible to mix the dicarboxylic acid, the 1,5-pentanediamine and specified amount of water together. There is no limitation to the mode for adding 1,5-pentanediamine or dicarboxylic acid in the present invention: 1,5-pentanediamine or dicarboxylic acid may be added gradually at a certain rate, or may be added all at once, and the mode for adding these materials comprises, but not limited to, direct pouring, spraying, and so on. In the present invention, there is no limitation to the state of dicarboxylic being added; it can be particles, powder, or the mixture thereof.

In the present invention, the amount of water that is mixed with 1,5-pentanediamine and dicarboxylic acid should be appropriate. If the water content therein is too low, it may require a higher temperature to melt the nylon salt, thus the stability of the salt may be decreased during the reaction and more of side-reaction and/or side-product will come into existence. If the water content therein is too high, it may cause the nylon salt present closely to or totally in state of solution, and the nylon salt in solid state may not be directly prepared accordingly, or otherwise the nylon salt prepared in such conditions has a high water content and is prone to harden during a long distance transportation. In the present invention, the amount of water as added to the 1,5-pentanediamine is preferably from 3% to 8% by weight, more preferably from 4% to 5% by weight, based on the total weight of 1,5-pentanediamine and dicarboxylic acid used as the starting material for preparing nylon salt.

In the method of the present invention, by adding specified amount of water in the salt formation, the nylon salt formed from 1,5-pentanediamine and dicarboxylic acid may present in a molten state at the temperature of 65 to 120° C., preventing occurrence of the incomplete reaction between 1,5-pentanediamine and dicarboxylic acid attributed to the nylon salt in solid state during the preparation process; increasing the reaction rate significantly; shortening the reaction time; and resulting in a very low content of diamine remained in the nylon salt. After completion of the reaction, cooling the reaction system to room temperature, a nylon salt product in solid state convenient for storing and transporting is obtained.

In the present invention, the order for adding water is changeable. That is, water may be first mixed with diamine, or first mixed with dicarboxylic acid, or added to the mixture of diamine and dicarboxylic acid, or mixed with each of diamine and dicarboxylic acid respectively before the reaction for producing nylon salt. All of these are within the scope of the invention so long as the amount of water added in the nylon salt is in accordance with the invention.

In the present invention, the mixture containing 1,5-pentanediamine is kept at a temperature of 65 to 120° C., preferably 70 to 100° C., more preferably 80 to 90° C. in the process for forming salt. If the reaction temperature is too low, the resulted nylon salt would not be in a molten state. On the contrary, if the reaction temperature is too high, a mild reaction condition would not be achieved, the reaction will run unstably, and some side-reactions will occur accordingly.

In the present invention, the molar ratio of 1,5-pentanediamine and dicarboxylic acid used in the reaction is not limited to equimolar. The amount of 1,5-pentanediamine as added should ensure that it reacts with dicarboxylic acid to form salt as completely as possible. The molar ratio of 1,5-pentanediamine to dicarboxylic acid is preferably 1/1 to 1/1.2, more preferably 1/1 to 1/1.05. The amount of dicarboxylic acid may be a little more than 1,5-pentanediamine so as to ensure a complete reaction of 1,5-pentanediamine. In the present invention, it is feasible to use one kind of dicarboxylic acid, or the combination of two or more kinds of dicarboxylic acid. In case of using two or more kinds of dicarboxylic acid, the molar number of dicarboxylic acid in the ratio mentioned above should be the sum of the molar number of each dicarboxylic acid. In the present invention, there is no limitation to the shape of dicarboxylic acid, it may be, for example, powder, particle or sheet-shaped crystal.

In the present invention, 1,5-pentanediamine is neutralized with dicarboxylic acid at the temperature of 65 to 120° C. to form nylon salt. After the completion of reaction, it may be feasible to lower the temperature of the resulted nylon salt to 20~40° C., preferably about 30° C.

More concretely, the present method for preparing nylon salt comprise steps: adding 2% to 12% by weight, based on the total weight of the 1,5-pentanediamine and the dicarboxylic acid, of water to 1,5-pentanediamine to obtain a mixture; heating the mixture to the temperature of 65 to 120° C.; adding dicarboxylic acid to the heated mixture under stirring, during which the dicarboxylic acid reacts with the 1,5-pentanediamine to form a salt; and cooling the resulting product to a temperature of 20 to 40° C. to obtain a nylon salt in solid state. Wherein the steps mentioned above are all conducted under the protection of inert gas.

To avoid 1,5-pentanediamine to be oxidized by oxygen in the air during the reaction, in one embodiment of the present invention, each step of the preparation is carried out under the protection of inert gas. The inert gas may be any gas which is not reacted with any component of the reaction system under above-mentioned conditions, including but not limited to nitrogen, helium, neon, argon, and the like.

In the present invention, there is no limitation to the source of 1,5-pentanediamine used as starting material. It may be prepared by a chemical method, for example, Suyama et al. (Decarboxylation Method of Lysine, fourth edition, Yakugaku Zasshi (1965), Vol. 85(6), pp, 531-533) disclosed a method in which lysine is boiled in cyclohexanol containing tetraline peroxide to produce pentanediamine. Japanese Unexamined Patent Publication (Kokai) No. SHO-60-23328 disclosed a method in which a vinyl ketone compounds of 2-cyclic vinyl ester is used as catalyst to prepare pentanediamine from lysine.

In addition, 1,5-pentanediamine used in the present invention may be prepared by a biological process. For example, lysine decarboxylase acts on lysine to produce an enzyme conversion solution and then the 1,5-pentanediamine is extracted from the solution (see JP200400114A). Furthermore, for example, expression of lysine decarboxylase is improved or recombined in strains being able to produce lysine by gene technology, which may convert the lysine produced in the process of fermentation to 1,5-pentanediamine simultaneously, obtaining a pentanediamine fermentation liquid by direct fermentation. (See: Construction of Genetically Engineered Bacteria of *Corynebacterium Glutmicum* to Produce 1,5-Pentanediamine by One Step, Niutao etc. China Biotechnology, 2010, 30(8):3-99)

The dicarboxylic acid used in the present invention may be those produced by a chemical or a biological method. It may be aliphatic dicarboxylic acid and derivatives thereof, aromatic dicarboxylic acid and derivatives thereof and heterocyclic dicarboxylic acid and derivatives thereof. The aliphatic dicarboxylic acid and derivatives thereof include but are not limited to short chain dicarboxylic acid (having less than 10 carbon atoms in carbon chain) and long chain dicarboxylic acid. The short chain dicarboxylic acid include but are not limited to succinic acid, glutaric acid, adipic acid, heptanedioic acid, octanedioic acid, azelaic acid, sebacic acid, and adipic acid is preferably used. The long chain dicarboxylic acid include but are not limited to undecanedioic acid, dodecanedioic acid, tridecanedioic acid, tetradecanedioic acid, pentadecanedioic acid, hexadecanedioic acid, heptadecanedioic acid, octadecanedioic acid, maleic acid, Δ9-1,18-octadecenedioic acid, and dodecanedioic acid is preferably used. The aromatic dicarboxylic acid and derivatives thereof include but are not limited to terephthalic acid. The heterocyclic dicarboxylic acid and derivatives thereof include but are not limited to furandicarboxylic acid. The derivatives of the dicarboxylic acid include but are not limited to acyl chloride.

In the present invention, the nylon salt formed in the reaction may be further subjected to drying, slicing and pelletizing to make it easier to be packaged, stored and transported, as required.

According to the present method for preparing nylon salt, the reaction condition is mild; the energy consumption is lowered; and an even mixing and heat-transferring of a liquid reaction system is shown during the reaction. There are also no limitations to the mode of stirring, the mode and the rate of adding reactants, and the shape of dicarboxylic acid. Besides, the reaction is carried out completely; the final nylon salt product has uniform shape and high purity; nearly no amine is remained therein; post-processing is simple; and no waste gas, waste liquid and waste solid is produced. Furthermore, the solid nylon salt powder with low water content, high purity and low diamine residual may be prepared just by drying and crushing without any additional purification, which may be directly used in the subsequent polymerization to gain a polyamide product with good quality, light color and without yellowing.

Please be noted that each reference as a whole as cited in this description, comprising patent documents and non-patent documents, should be regarded as the parts of the disclosure.

The present invention will be particularly described below by way of Examples. All the contents mentioned herein are percent concentrations based on weight unless otherwise specified. In the following Examples, the stability of nylon salt at room temperature was also measured by monitoring the absorbance of the resulting nylon salt so as to confirm that the color of the nylon salt is complied with the national standards and the requirements for polymer.

Preparation and determination of substances such as samples used in the Examples and Comparative Examples were described as below.

1. pH Determination of Nylon Salt

Taking a nylon salt sample, adding water to obtain a dilute solution with a concentration of 10%, and measuring the pH value of the solution at 25° C.

2. Testing for Nylon Salt UV Index
SH/T 1498.7-1997
3. Stability Measurement

At room temperature, taking the resulting nylon salt, keeping it under a pressure of 10 kg for 24 hours, and then observing whether the nylon salt was hardened or not.

Example 1

To a 100 L enamel reaction vessel for salt formation, which was vacuumized and filled with nitrogen for 3 times, was added 22 kg of 1,5-pentanediamine with a purity of 99.5% and 1.3 kg of water (accounting for 2.4% of the total weight of 1,5-pentanediamine and adipic acid as used) under nitrogen atmosphere. The mixture of 1,5-pentanediamine and water was heated to 112° C., then 31.6 kg of adipic acid (made by China national petroleum corporation, Liaoyang branch) was added thereto. Starting a strong agitation and under the temperature mentioned above, the reaction system became viscous, such agitation was continued for 3 hours, and then the pH of the final nylon salt was adjusted to 7.3 by adding a bit of acid and/or amine.

Nitrogen was introduced to the vessel until the pressure was 0.2 MPa (gauge pressure), then discharging the product in the melt. After cooling and slicing, a sample without characteristic odor of the pentanediamine was obtained.

Example 2

To a 500 ml three-neck flask, which was vacuumized and filled with nitrogen for 3 times, was added 110 g of 1,5-pentanediamine (made by Cathay Industrial Biotech Ltd) and 8 g of water (accounting for 3% of the total weight of 1,5-pentanediamine and adipic acid as used) under nitrogen atmosphere. At a temperature of 80° C., 158 g of adipic acid (made by China national petroleum corporation Liaoyang branch) was added to the flask. Starting a strong agitation and under the temperature mentioned above, the reaction system became viscous. Such agitation was continued for an hour, and the reaction of salt formation was complete, obtaining a nylon salt product of viscous paste. The product was poured out from the flask, left to stand until cooling to room temperature, and sliced, obtaining a solid nylon salt sample without characteristic odour of the pentanediamine.

Example 3

To a 100 L enamel reaction vessel for salt formation, which was vacuumized and filled with nitrogen for 3 times, was added 22 kg of 1,5-pentanediamine with a purity of 99.5% and 31.6 kg of adipic acid (made by China national petroleum corporation Liaoyang branch) under nitrogen atmosphere before heating. Then 2.1 kg of water (accounting for 4% of the total weight of 1,5-pentanediamine and adipic acid as used) was added to the vessel. The temperature was kept at 85. Starting a strong agitation and under the temperature mentioned above, the reaction system became viscous, such agitation was continued for half an hour, and then the pH of the final nylon salt was adjusted to 7.0 by adding a bit of acid and/or amine.

Nitrogen was introduced to the vessel until the pressure was 0.2 MPa (gauge pressure), then discharging the product in the melt. After cooling and slicing, a sample without characteristic odor of the pentanediamine was obtained.

Example 4

To a 100 L enamel reaction vessel for salt formation, which was vacuumized and filled with nitrogen for 3 times, was added 22 kg of 1,5-pentanediamine with a purity of 99.5% and 31.6 kg of adipic acid (made by China national petroleum corporation Liaoyang branch) under nitrogen atmosphere before heating. Then 2.7 kg of water (accounting for 5% of the total weight of 1,5-pentanediamine and adipic acid as used) was added to the vessel. The temperature was kept at 85. Starting a strong agitation and under the temperature mentioned above, the reaction system became viscous, such agitation was continued for half an hour, and then the pH of the final nylon salt was adjusted to 7.2 by adding a bit of acid and/or amine.

Nitrogen was introduced to the vessel until the pressure was 0.2 MPa (gauge pressure), then discharging the product in the melt. After cooling and slicing, a sample without characteristic odor of the pentanediamine was obtained.

Example 5

To a 100 L enamel reaction vessel for salt formation, which was vacuumized and filled with nitrogen for 3 times, was added 22 kg of 1,5-pentanediamine with a purity of 99.5% under nitrogen atmosphere. The 1,5-pentanediamine was heated to 60° C. and 34.8 kg of solid slurry (containing 3.2 kg of water) of adipic acid (made by China national petroleum corporation Liaoyang branch) was slowly added to the vessel in an hour. After the addition, the temperature of the reaction system was controlled to 90° C. Starting a strong agitation and under the temperature mentioned above, the reaction system became viscous, such agitation was continued for 2 hours, and then the pH of the final nylon salt was adjusted to 7.2 by adding a bit of acid and/or amine.

Nitrogen was introduced to the vessel until the pressure was 0.2 MPa (gauge pressure), then discharging the product in the melt. After cooling and slicing, a sample without characteristic odor of the pentanediamine was obtained.

Example 6

To a 100 L enamel reaction vessel for salt formation, which was vacuumized and filled with nitrogen for 3 times, was added 22 kg of 1,5-pentanediamine with a purity of 99.5%, 31.6 kg of adipic acid (made by China national petroleum corporation Liaoyang branch) and 4.3 kg of water (accounting for 8% of the total weight of 1,5-pentanediamine and adipic acid as used) under nitrogen atmosphere. The reaction system was heated to 70° C. Starting a strong agitation and under the temperature mentioned above, the reaction system became viscous, such agitation was continued for half an hour, and then the pH of the final nylon salt was adjusted to 8.3 by adding a bit of acid and/or amine.

Nitrogen was introduced to the vessel until the pressure was 0.2 MPa (gauge pressure), then discharging the product in the melt. After cooling and slicing, a sample without characteristic odor of the pentanediamine was obtained.

Example 7

To a 100 L enamel reaction vessel for salt formation, which was vacuumized and filled with nitrogen for 3 times, was added 22 kg of 1,5-pentanediamine with a purity of 99.5%, 31.6 kg of adipic acid (made by China national petroleum corporation Liaoyang branch) and 6.4 kg of water (accounting for 12% of the total weight of 1,5-pentanediamine and adipic acid as used) under nitrogen atmosphere. The reaction system was heated to 70° C. Starting a strong agitation and under the temperature mentioned above, the reaction system became viscous, such agitation was continued for half an hour, and then the pH of the final nylon salt was adjusted to 8.5 by adding a bit of acid and/or amine.

Nitrogen was introduced to the vessel until the pressure was 0.2 MPa (gauge pressure), then discharging the product in the melt. After cooling and slicing, a sample without characteristic odor of the pentanediamine was obtained.

Example 8

To a 100 L enamel reaction vessel for salt formation, which was vacuumized and filled with nitrogen for 3 times, was added 20 kg of 1,5-pentanediamine with a purity of 99.5%, 2 kg of caprolactam, 28.5 kg of solid adipic acid (made by China national petroleum corporation Liaoyang branch), and 4 kg of water under nitrogen atmosphere. After the addition, the temperature of the reaction system was controlled to 89° C. Starting a strong agitation and under the temperature mentioned above, the reaction system became viscous, such agitation was continued for one and a half hours, and then the pH of the final nylon salt was adjusted to 7.8 by adding a bit of acid and/or amine.

Nitrogen was introduced to the vessel until the pressure was 0.2 MPa (gauge pressure), then discharging the product in the melt. After cooling and slicing, a sample without characteristic odor of the pentanediamine was obtained.

Example 9

To a 100 L enamel reaction vessel for salt formation, which was vacuumized and filled with nitrogen for 3 times, was added 20 kg of 1,5-pentanediamine with a purity of 99.5%, 34.3 kg of solid adipic acid (made by China national petroleum corporation Liaoyang branch), and 5.4 kg of water under nitrogen atmosphere. After the addition, the temperature of the reaction system was controlled to 95° C. Starting a strong agitation and under the temperature mentioned above, the reaction system became viscous, and such agitation was continued for one and a half hours before the reaction was complete.

Nitrogen was introduced to the vessel until the pressure was 0.2 MPa (gauge pressure), then discharging the product in the melt. After cooling and slicing, a sample without characteristic odor of the pentanediamine was obtained.

Example 10

To a 100 L enamel reaction vessel for salt formation, which was vacuumized and filled with nitrogen for 3 times, was added 11 kg of 1,5-pentanediamine with a purity of 99.2% and 1.6 kg of water (accounting for 6% of the total weight of 1,5-pentanediamine and decanedioic acid as used) under nitrogen atmosphere. At a temperature of 90° C., decanedioic acid (made by Hebei Hengshui Dongfeng Chemicals Co., Ltd) was added to the flask. Starting a strong agitation and under the temperature mentioned above, the reaction system became viscous, and such agitation was continued for half an hour. Appropriate amount of acid and amine were added to adjust the pH of the final nylon salt to 7.3. The reaction of salt formation was complete, obtaining a nylon salt product presenting in a state of viscous paste.

Nitrogen was introduced to the vessel until the pressure was 0.2 MPa (gauge pressure), then discharging the product in the melt. After cooling and slicing, a sample without characteristic odor of the pentanediamine was obtained.

Example 11

To a 100 L enamel reaction vessel for salt formation, which was vacuumized and filled with nitrogen for 3 times, was added 0.5 kg of water (2% of the total weight of all the materials) under nitrogen atmosphere. And then 10 kg of pentanediamine with a purity of 99.2% was added to obtain a mixture which was heated to a temperature of 85° C. with stirring, and then 16 kg of terephthalic acid was added thereto. Starting a strong agitation and under the temperature mentioned above, the reaction system became viscous, such agitation was continued for half an hour before the reaction of salt formation was complete obtaining a nylon salt aqueous solution, and the final nylon salt product was in a state of viscous paste.

Nitrogen was introduced to the vessel, then discharging the product in the melt. After cooling and slicing, a sample without characteristic odor of the pentanediamine was obtained.

Comparative Example 1

To a 500 ml three-neck flask, which was vacuumized and filled with nitrogen for 3 times, was added 100 g of 1,5-pentanediamine with a purity of 99.5% under nitrogen atmosphere. At a temperature of 80° C., 142 g of adipic acid (made by China national petroleum corporation Liaoyang branch) was added to the flask. Starting a strong agitation and under the temperature mentioned above, the reaction system became so viscous that it became difficult to be stirred. The temperature was increased to 120° C. but the reaction system was still viscous and couldn't be stirred. Solid mixture obtained was poured out of the flask with a strong smell of amine which proved that the reaction of salt formation was uncompleted.

Comparative Example 2

To a 500 ml three-neck flask, which was vacuumized and filled with nitrogen for 3 times, was added 100 g of pentanediamine with a purity of 99.5% and 43 g of water. At a temperature of 80° C., 142 g of adipic acid (made by China national petroleum corporation Liaoyang branch) was added to the flask. Starting a strong agitation and under the temperature mentioned above, the reaction system became viscous but still could be stirred. Such agitation was maintained for two hours. After completion of the reaction, solid mixture obtained was poured out of the flask. After cooling to room temperature, a nylon salt sample was taken which essentially did not have characteristic odour of the pentanediamine.

Application Example 1

The nylon salt samples prepared by the Examples and Comparative Examples were exposed to the air and preserved at room temperature. Three days later, the UV index of the samples was determined. Refer to Table 1 for details.

Application Example 2

200 g of the nylon salt samples prepared by the Examples and Comparative Examples was each individually placed in a plastic sample bag. A five kilos of metal block was placed on top of the sample bag which was preserved in a bake oven at 55° C. for more than 6 hours. Then the samples were cooled at room temperature and measured about hardening. Refer to Table 1 for details.

TABLE 1

| | UV Index of Nylon Salt * 10⁻³ | Storage Stability |
|---|---|---|
| Example 1 | 0.12 | Platelike<br>No Adhesiveness |
| Example 2 | 0.09 | Platelike<br>No Adhesiveness |
| Example 3 | 0.25 | Platelike<br>No Adhesiveness |
| Example 4 | 0.06 | Platelike<br>Mainly No Adhesiveness |
| Example 5 | 0.08 | Platelike<br>No Adhesiveness |
| Example 6 | 0.09 | Platelike<br>No Adhesiveness |
| Example 7 | 0.05 | Platelike<br>No Adhesiveness |
| Example 8 | 0.06 | Platelike<br>No Adhesiveness |
| Example 9 | 0.06 | Platelike<br>No Adhesiveness |
| Example 10 | 0.05 | Platelike<br>No Adhesiveness |
| Example 11 | 0.07 | platelike<br>No Adhesiveness |
| Comparative Example 1 | 3.5 | Platelike and Powdery<br>No Adhesiveness |
| Comparative Example 2 | 0.06 | Platelike<br>Obvious Adhesiveness |

As shown in above table, the nylon salts prepared by the Examples of the invention have significant reduction in the UV index with stability unaffected for the complete reaction between the diamine and the dicarboxylic acid, in comparison with the Comparative Example 1. The nylon salts prepared by the Examples of the invention have succeeded in controlling the water content which improves the nylon salt's stability for transport and storage with the UV index unaffected, in comparison with the Comparative Example 2.

Unless otherwise specified, the terms used in the present invention have the meanings as commonly understood by one skilled in the art.

The embodiments described herein are for illustrative purposes only and are not intended to limit the scope of the invention. Various alternatives, alterations and modifications can be made by one skilled in the art within the scope of the invention. The present invention is not limited to the above-described embodiments, but only defined by the claims.

What is claimed is:

1. A method for preparing nylon salt, comprising step of:
mixing 1,5-pentanediamine, water and aliphatic dicarboxylic acid at a temperature of 89 to 95° C. obtain the nylon salt, wherein the molar ratio of the 1,5-pentanediamine and the dicarboxylic acid is 1/0.9 to 1/1.2 and the amount of water is 8% to 12% by weight based on the total weight of the 1,5-pentanediamine and the dicarboxylic acid.

2. The method according to claim 1, wherein said method comprises:
a) mixing 1,5-pentanediamine and water to obtain a mixture;
b) heating the mixture to the temperature of 89 to 95° C.; and
c) adding dicarboxylic acid to the heated mixture to obtain the nylon salt;
wherein the amount of the water is 8% to 12% by weight based on the total weight of the 1,5-pentanediamine and the dicarboxylic acid.

3. The method according to claim 2, wherein said step b) comprises: heating the mixture to a temperature of 89 to 90° C.

4. The method according to claim 2, wherein said step c) comprises: adding the dicarboxylic acid to the heated mixture, the dicarboxylic acid reacting with the 1,5-pentanediamine, and cooling the resulting product to a temperature of 20 to 40° C. to obtain the nylon salt.

5. The method according to claim 1, wherein the method is carried out under a protection of inert gas that is one or more selected from the group consisting of nitrogen, helium, neon and argon.

6. A nylon salt prepared by the method according to claim 1.

7. The method according to claim 1, wherein the dicarboxylic acid is one or more selected from the group consisting of decanedioic acid, dodecanedioic acid, and succinic acid.

8. The method according to claim 1, wherein the dicarboxylic acid is adipic acid.

* * * * *